(12) United States Patent
Godet

(10) Patent No.: US 12,139,345 B2
(45) Date of Patent: Nov. 12, 2024

(54) CONTAINER BOTTOM INVERSION DEVICE

(71) Applicant: SIDEL PARTICIPATIONS, Octeville-sur-Mer (FR)

(72) Inventor: Florian Godet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 18/095,105

(22) Filed: Jan. 10, 2023

(65) Prior Publication Data

US 2023/0227269 A1 Jul. 20, 2023

(30) Foreign Application Priority Data

Jan. 14, 2022 (FR) ...................................... 2200299

(51) Int. Cl.
*B65G 47/248* (2006.01)

(52) U.S. Cl.
CPC .... *B65G 47/248* (2013.01); *B65G 2201/0244* (2013.01)

(58) Field of Classification Search
CPC ... B67C 3/24; B67C 2003/226; B65G 47/248; B65G 2201/0244; B65G 2201/0247
See application file for complete search history.

(56) References Cited

U.S. PATENT DOCUMENTS

| | | | |
|---|---|---|---|
| 4,790,662 A | 12/1988 | Bischkopf | |
| 8,172,290 B2 * | 5/2012 | Nishino | B65B 55/08 |
| | | | 294/902 |
| 2016/0059981 A1 * | 3/2016 | Pace | B65C 3/14 |
| | | | 425/149 |
| 2017/0297758 A1 * | 10/2017 | Stenner | B65C 9/045 |
| 2018/0186498 A1 * | 7/2018 | Godet | B67C 3/22 |
| 2019/0330038 A1 * | 10/2019 | Melrose | B65B 43/50 |
| 2020/0346809 A1 * | 11/2020 | Godet | B65B 61/24 |

FOREIGN PATENT DOCUMENTS

| | | |
|---|---|---|
| DE | 102012017364 A1 | 3/2014 |
| WO | 2008004458 A1 | 1/2008 |
| WO | 2015039690 A1 | 3/2015 |
| WO | 2019122563 A1 | 6/2019 |

OTHER PUBLICATIONS

French Search Report dated Oct. 13, 2022.

* cited by examiner

*Primary Examiner* — Gregory W Adams

(57) ABSTRACT

Described is a device for inverting the base of a container, comprising means for inverting the base, and at least one tool for holding the container, each holding tool having a retaining member, characterized in that the retaining member has a bearing end that is brought to bear against a container, and in that each holding tool also comprises a centering member mounted inside the retaining member, the centering member being moveable inside the retaining member.

12 Claims, 6 Drawing Sheets

CONTAINER BOTTOM INVERSION DEVICE

Figure 1:
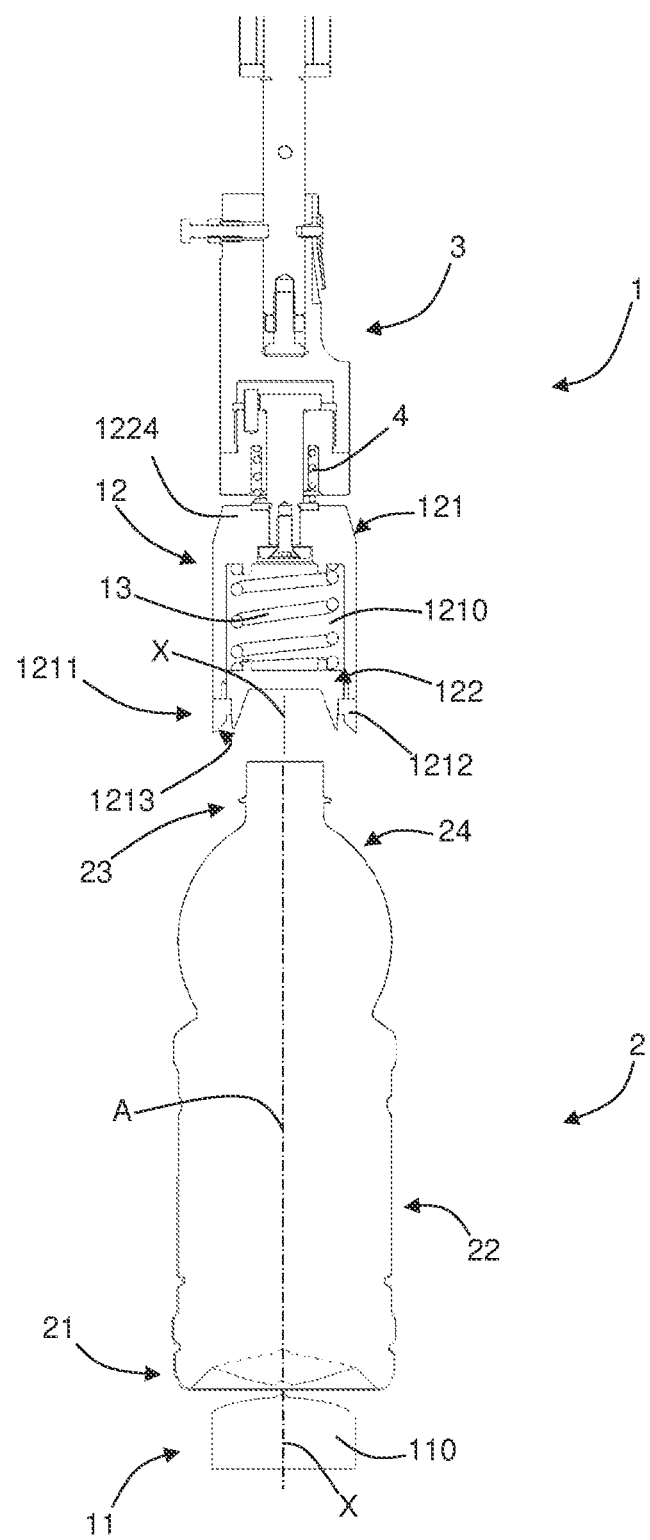

This application claims the benefit of and priority to French Application Serial No. 2200299, filed on Jan. 14, 2022, the disclosure of which is incorporated herein by reference in its entirety.

The invention pertains to the design and manufacture of packaging tools.

More specifically, the invention relates in particular to a device for inverting container bases after filling with a hot product and then capping, as well as to a corresponding method.

For reasons of hygiene and to guarantee the integrity of the products to be consumed, certain containers are filled with hot products (generally between 60° C. and 90° C.).

By way of example, bottles containing fruit juices or teas, for example.

When a container is filled with a hot product and then capped, the cooling of the content causes a pressure drop that tends to deform the container.

This results in poor container stability, which can prevent the formation of container packs, thereby preventing palletization for easy transport to the point of sale.

Dedicated hot-fill containers have been developed to address this issue.

Some of these containers have a base with an invertible diaphragm.

More specifically, the base diaphragm of these containers can adopt:
a filling state in which the concave diaphragm projects away from the container, and
a rigid state in which the concave diaphragm projects into the container.

When filling, the diaphragm is therefore in the filling state.

The change in the diaphragm state is known to person skilled in the art as a "base inversion".

Once the container has been filled with a hot liquid and capped, the cooling of the content causes a pressure drop inside the container that tends to deform the container and makes the container easily malleable.

Malleable means that the container is ovalized and the shape of the container can be modified by a user easily and with little effort.

Furthermore, as explained above, this lack of structural rigidity hinders or even prevents the palletization of the filled containers.

The inversion of the shape of the base diaphragm resolves this problem.

Indeed, when the base switches from the filling state to the rigid state, the volume of the container is reduced, which increases the pressure inside the container.

This pressure increase compensates for the pressure drop caused by the cooling of the content and the cooling of the gas in the top of the container.

The compensation of the pressure drop then makes the container more rigid, enabling the container to be packed and palletized for transport.

A container base inversion device is used to switch the base from the filling state to the rigid state.

Such a device conventionally comprises:
means for conveying the containers along a predetermined path,
means for inverting the base, and
means for holding the container.

The holding means hold the container while the inverting means exert a force on the base of the container to switch the container from the filling state to the rigid state.

However, such devices can be improved.

Indeed, there is a risk of damage being caused to the container when inverting the base using existing devices.

Existing devices exert a counter pressure on the cap to hold the container when the base is being inverted.

Although this method is suitable for small containers (for example, containers with a capacity of less than one liter), this method is not suitable for large containers, and even less so for containers with a portion between the neck and the body, i.e., a shoulder, that has a curved shape. Indeed, a force exerted on the neck can force the neck into the body of the container.

When the containers reach the inversion device, i.e. after filling, capping and cooling, the containers are not always held correctly during the base inversion process.

The holding means are therefore designed to ensure that the containers are correctly positioned and to counteract the forces when inverting the base.

To do so, the retaining means comprise a bell for the top of the container that is intended to bear partially on the shoulder or the cap of the container and to follow the container along the conveyance means. When inverting the base, the lower portion of the container is positioned using a ring surrounding the lower portion of the container.

The height of the bell can be adjusted along an axis of translation perpendicular to the path of the container and has an open contour that enables cooperation with a container, which also helps to center the container, or to remove the container after inverting the base.

Such bells can therefore not be used for large containers, since the opening of the bell means that the reactive force exerted by the bell is not exclusively axial, but at least partially lateral, which deforms the container when inverting the base.

In other words, the reactive and inverting forces are not opposed, which causes the container to buckle.

The invention is notably intended to overcome the drawbacks in the prior art.

More specifically, the invention provides a container base inversion device that causes little or no damage to the container.

The invention also provides such an inversion device that provides for the continuous guidance of container being conveyed inside a packaging machine comprising such an inversion device.

The invention also provides such an inversion device that facilitates the inversion of the base of the containers.

These objectives, and other objectives set out below, are achieved by the invention, which discloses a device for inverting container bases, the inversion device comprising:
means for inverting the base along an axis of translation, and
at least one tool for holding the container,
the at least one holding tool comprising a retaining member having a central recess,
the at least one holding tool being moveable in translation along the axis of translation between a position withdrawn from a container and a position cooperating with a container, characterized in that the retaining member has a bearing end that bears against a shoulder of the container in the cooperating position,
and in that the at least one holding tool also comprises:
a centering member mounted in the central recess of the retaining member that is intended to cooperate with a cap rigidly connected to a neck of the container, the centering member being moveable inside the retaining member between:

a first position, corresponding to the withdrawn position of the retaining member, in which the centering member is near to the bearing end of the retaining member, and a second position, corresponding to the cooperating position of the retaining member, in which the centering member is withdrawn from the bearing end of the retaining member.

Such an inversion device allows the base of the container to be inverted without any risk of damage, for example by crushing.

By mounting the centering member moveably in the retaining member, the container can be centered before the base is inverted, which ensures the satisfactory absorption of holding forces by the container.

Despite the force exerted by the inverting means on the base of the container, the use of the centering member to correctly center the container before retention by the retaining member allows the forces to be absorbed by the structural zones of the container provided for this purpose.

According to an advantageous aspect, the centering member has a concave frustoconical shape, i.e. flared outwards, intended to cooperate with the cap of the container.

This concave frustoconical shape enables the container to be mechanically centered by cooperation with the cap thereof.

Indeed, if the container is incorrectly positioned, cooperation between the centering member and the cap aligns the container. This is due to the frustoconical shape moving the container so that the cap is entirely in contact with the frustoconical shape and therefore correctly positioned so that the main axis of the container is coincident, or almost coincident, with the axis of translation of the inverting means.

According to another advantageous aspect, the bearing end of the retaining member has a concave frustoconical shape, i.e. flared outwards, intended to bear against the shoulder of the container.

This concave frustoconical shape, i.e. flared outwards, enables the container to be held correctly.

This shape also ensures good cooperation between the shoulder of the container (which is usually also frustoconical or rounded) and the retaining member.

This prevents the inversion forces from being applied to only one portion of the retaining member, which could damage the container, and in particular crush the container irregularly.

According to another advantageous aspect, the retaining member has a bell shape, and the at least one holding tool comprises a return element interposed between a base of the bell and the centering member, the return element tending to position the centering member in the first position.

The return element thus ensures that the container is centered during the movement of the retaining member until the retaining member has secured the container.

The container therefore remains correctly positioned from when centering begins until the container is in the final holding position.

This obviates the risk of the container returning to an incorrect position before being held in position.

According to another advantageous aspect, the retaining member includes a tip carrying the bearing end, the tip being removably mounted on a free end of the bell opposite the base.

The use of a tip allows the device to be adapted to different sizes or shapes of containers.

By changing the tip, the inversion device can be adapted to the size, and notably the diameter, of the containers to be held.

According to another advantageous aspect, the inversion device comprises a shaft rigidly connected to drive means, and the retaining member can be rigidly connected to the shaft via damping means.

The damping means ensure that the retaining member is brought smoothly to bear against the container to be held, and that the pressure on the container is increased gradually.

This reduces the risk of the container being deformed when the base is inverted.

The invention also relates to a holding tool for a container base inversion device, as described above.

The invention also relates to a method for inverting a base of a container using an inversion device as described above, the method comprising the following steps:

holding a container with a base to be inverted, and
inverting the base of said container by moving the inverting means along the axis of translation, characterized in that the step that involves holding the container includes the following sub-steps:

moving the holding tool towards the container along the axis of translation until the centering member is bearing against the cap of said container, holding the centering member against the cap of said container, and moving the retaining member towards the container along the axis of translation.

According to an advantageous aspect, at least one of the following rules is applied to the method for inverting a base:

the inversion of the base is initiated once the centering member is bearing against the container and before the retaining member is bearing against a shoulder of the container, the retaining member is released from the container before the inverting means have completed a return movement to a starting position.

the retaining member is in contact with the container before the inverting means start to move, the retaining member is kept in contact with the container until the inverting means have stopped moving.

These different rules provide a method for inverting the base of a container in which the structural integrity of the container is preserved.

Figure 2:
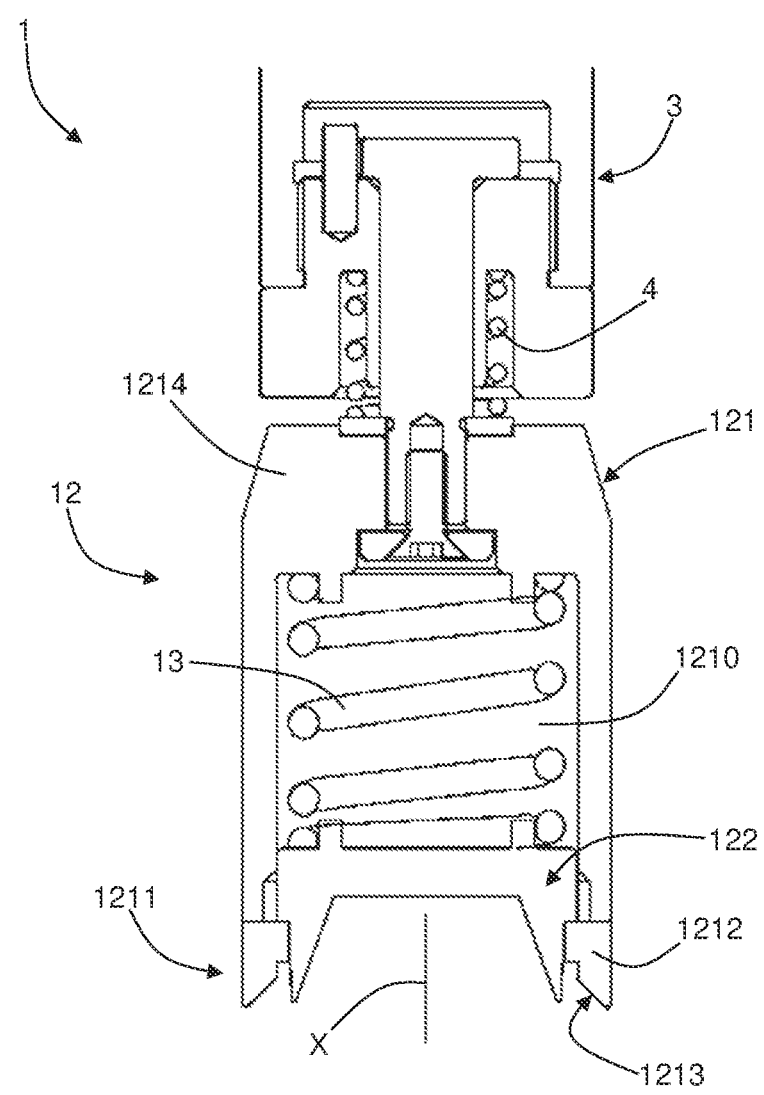
Figure 3:
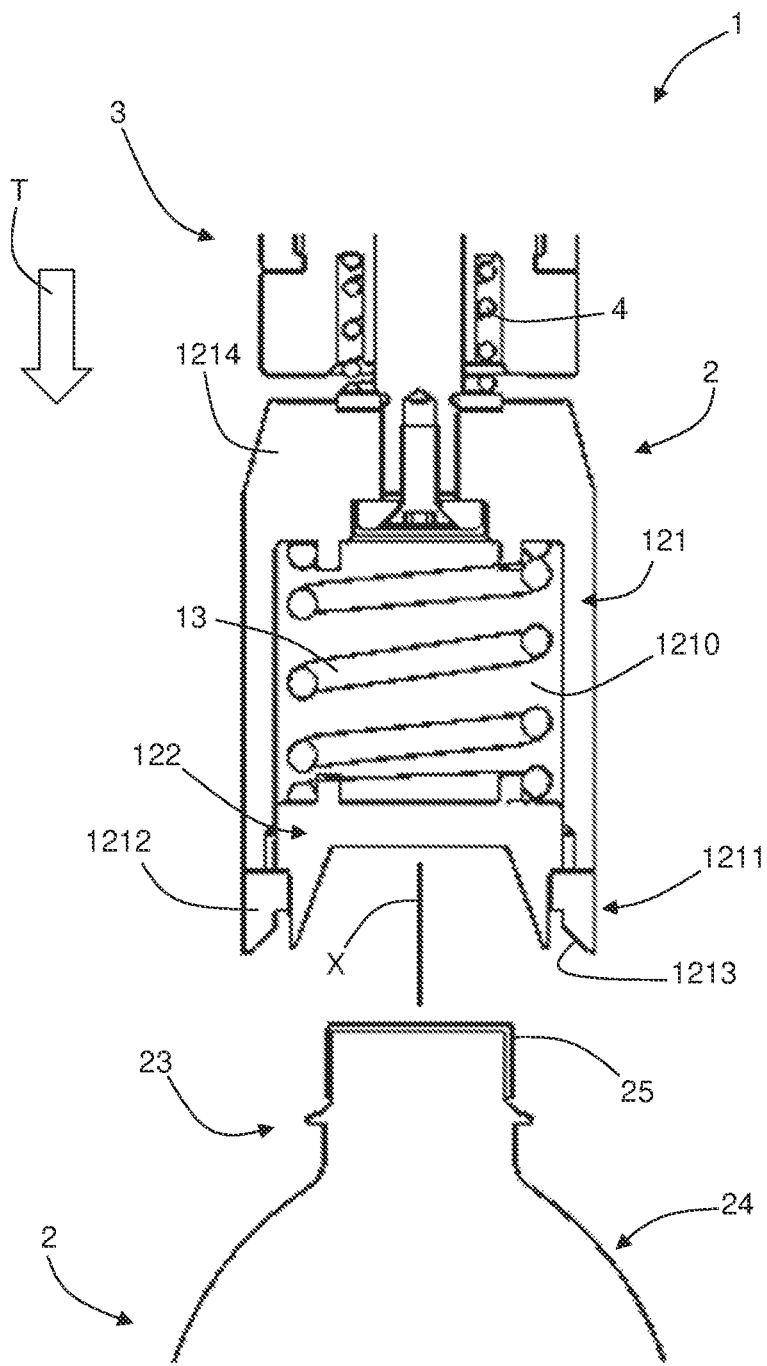
Figure 4:
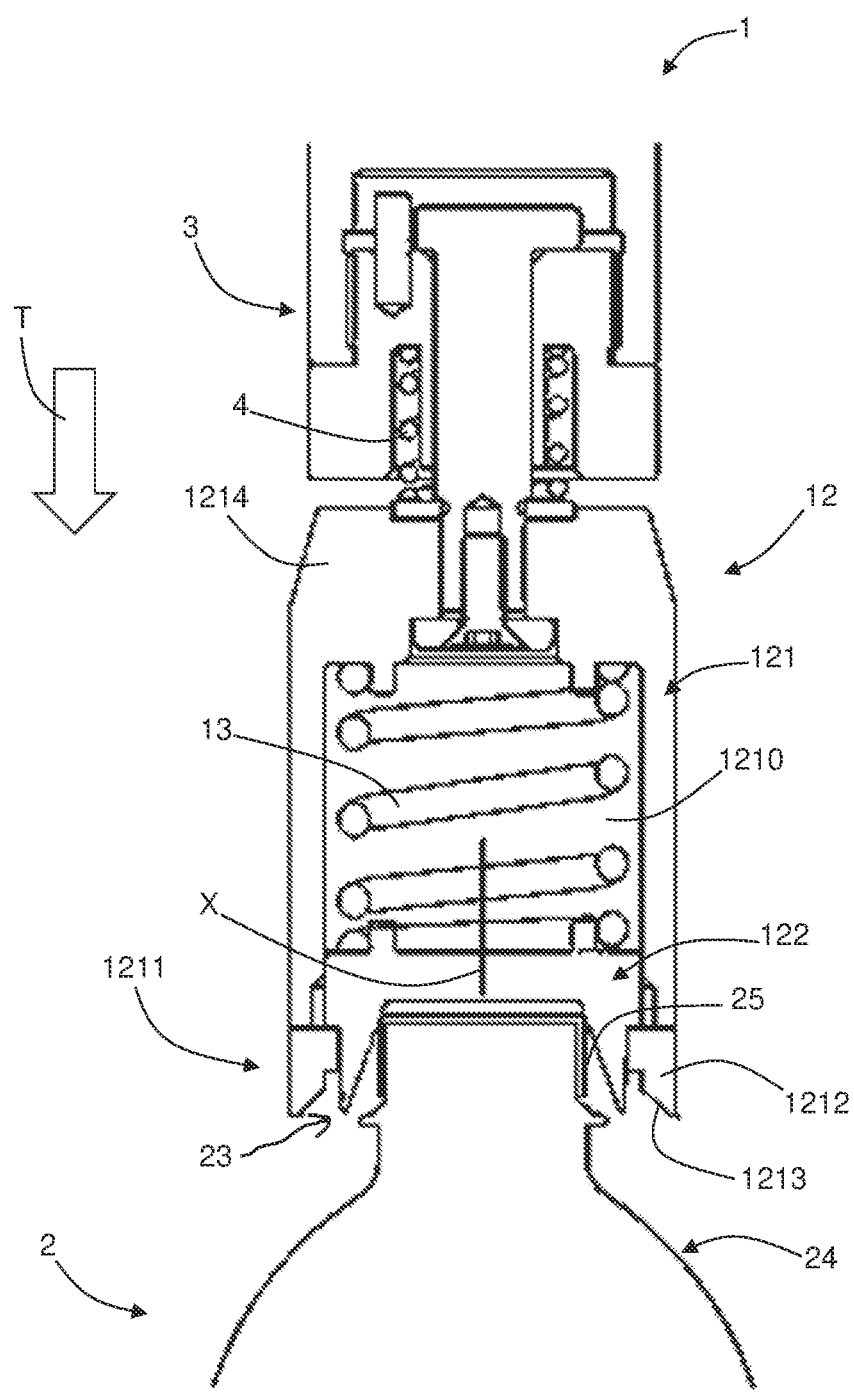
Figure 5:
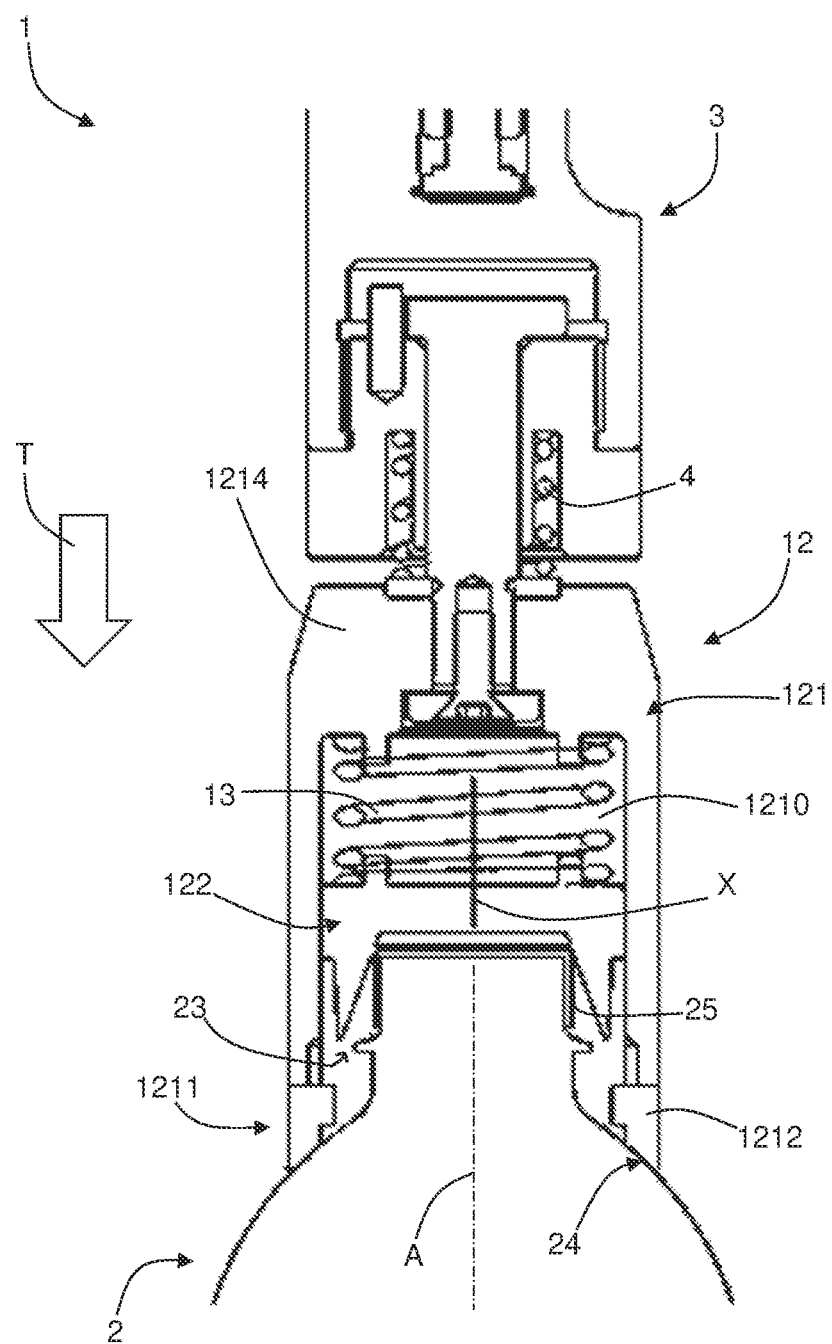
Figure 6:
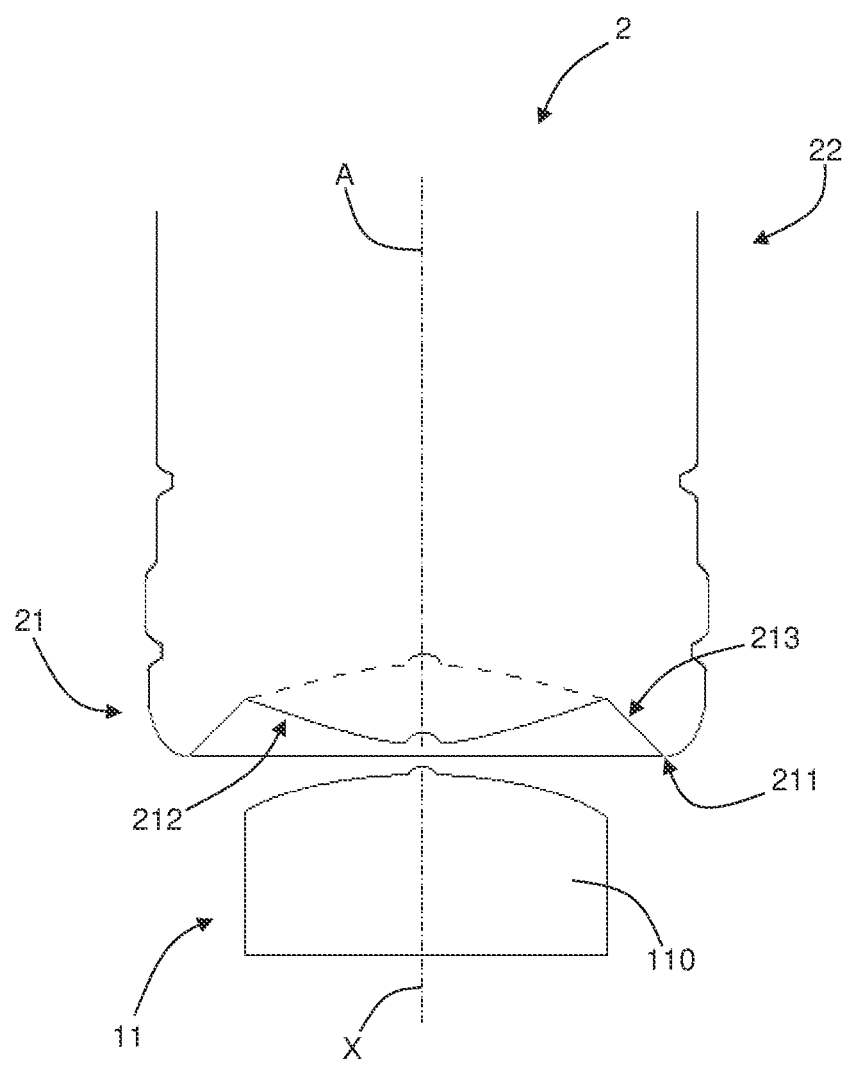

Other features and advantages of the invention will become more clearly apparent on reading the description of a preferred embodiment, given below by way of non-limiting example, and the attached drawings, in which:

FIG. 1 is a schematic front view of a container base inversion device according to the invention, FIG. 2 is a detail view of a holding tool for the container base inversion device according to the invention, FIG. 3 is a schematic view of a first sub-step for holding a container during a container base inversion method using the inversion device according to the invention, FIG. 4 is a schematic view of a second sub-step for holding a container during a container base inversion method using the inversion device according to the invention, FIG. 5 is a schematic view of a third sub-step for holding a container during a container base inversion method using the inversion device according to the invention, FIG. 6 is a schematic view of a container base before and after inversion of the base.

FIG. 1 shows a device 1 for inverting the base 21 of a container 2 according to the invention.

As shown in FIG. 1, a container 2, notably a container 2 made of plastic material such as PET, comprises:
- a body 22 extending along a main axis A,
- a base 21 closing the body 22 at a lower end of the container 2, and
- a neck 23 with a mouth, located at an upper end of the container 2, opposite the base 21.

The neck 23 is connected to the body 22 via a shoulder 24.

The mouth of the neck is closed by a cap 25, once the container 2 has been filled.

As illustrated in greater detail in FIG. 6, the base 21 comprises:
- a seat 211 enabling the container 2 to rest on a bearing plane,
- a diaphragm 212 extending from the main axis A towards the seat 211, and
- a frustoconical portion 213 connecting the seat 211 to the diaphragm 212.

The diaphragm 212 can be switched between a concave and a convex state. Invertible bases 21 can also have other shapes.

More specifically, the diaphragm 212 may adopt:
- a first position, shown as a solid line in FIG. 6, in which the diaphragm 212 has a convex shape from the outside of the container 2, and
- a second position, shown as a dashed line in FIG. 6, in which the diaphragm 212 has a concave shape from the outside of the container 2.

The concave and convex shapes are formed by the central portion of the diaphragm 212.

The inversion device 1 enables the position of the diaphragm 212 of the base 21 of the container 2 to be switched from a first position after the container has been filled, for example with a hot product, to a second position.

For this purpose, the inversion device 1 comprises:
- means 11 for inverting the base 21 that are moveable along an axis X of translation, and
- at least one tool 12 for holding the container 2.

The axis X of translation is advantageously coincident with the main axis A of the container 2.

As illustrated in FIGS. 1 and 6, the inverting means 11 comprise an insert 110 that is moveable in translation along the axis X of translation, said insert 110 being moved in translation by drive means (not shown).

By way of example, the drive means can be a cylinder or a cam/cam follower system, in which case the insert 110 is connected to a cam follower running on a cam rigidly connected to a frame of the inversion device 1.

With reference to FIG. 2, each holding tool 12 has a retaining member 121 and a centering member 122.

The centering member 122 is intended to center a container 2 along the axis X of translation before the retaining member 121 is actuated.

In other words, the centering member 122 ensures that the axis X of translation of the inverting means 11 and the main axis A of the container 2 are coaxial.

More specifically, the retaining member 121 has a central recess 1210 in which the centering member 122 is mounted. Preferably, the centering member is mounted concentrically with the retaining member 121.

The retaining member 121 is moveable in translation along the axis X of translation between a position withdrawn from a container 2, as shown in FIG. 3, and a position cooperating with a container 2, as shown in FIG. 5.

The retaining member 121 has a bearing end 1211 that bears against the container 2, preferably at the shoulder 24, when in the cooperating position. The shoulder is the portion of the container that forms the connection between the body and the neck, in which the neck is smaller than the body. The shoulder 24 can have different shapes, for example a frustoconical shape or a curved shape, for example a sphere.

More specifically and as illustrated in FIG. 6, the bearing end 1211 is carried by a tip 1212, for example made of plastic.

The tip 1212 has a frustoconical portion 1213 intended to come into contact with the shoulder 24 of the container 2.

The tip 1212 of the retaining member 121 has a concave frustoconical shape allowing the tip to fit containers 2 having differently shaped shoulders.

With reference to FIG. 2, the retaining member 121 has a bell shape with a base 1214 opposite the bearing end 1211.

The centering member 122 is mounted concentrically in the central recess 1210 of the retaining member 121 and is intended to cooperate with the cap 25 rigidly connected to the neck 23 of the container 2.

The centering member 122 is moveable inside the retaining member 121 between:
- a first position near to the bearing end 1211 of the retaining member 121, and
- a second position withdrawn from the bearing end 1211 of the retaining member 121.

The first position of the centering member 122 advantageously corresponds to the withdrawn position of the retaining member 121 and the second position of the centering member 122 advantageously corresponds to the cooperating position of the retaining member 121.

With reference to FIG. 5, when the bearing end 1211 of the retaining member 121 is in contact with the shoulder 24 of the container 2, the centering member 122 is in the second position, compressing the return element 13. The return element 13 thus exerts a force to keep the centering member 122 in cooperation with the container 2, in particular with the cap 25, which keeps the container 2 centered for inversion of the base 21.

Conversely, when the retaining member 121 is moved to release the container 2 after inversion, the return element 13 then exerts a force on the centering member 122 to position the centering member in the first position withdrawn from the base 1214 of the retaining member 121.

The centering member 122 has a concave frustoconical shape, i.e. an outward flared shape, intended to cooperate with the container 2, in particular the cap 25 thereof.

As shown in FIGS. 2, 3, 4 and 5, for each holding tool 12, the inversion device 1 includes a return element 13 interposed between the base 1214 of the bell of the retaining member 121, and the centering member 122.

This return element 13 tends to position the centering member 122 in the first position.

By way of illustrative non-limiting example, the return element 13 is a compression spring interposed between the centering member 122 and the base 1214 of the retaining member 121.

According to the embodiment illustrated in FIGS. 1 to 5, the tip 1212 forming the bearing end 1211 of the holding means 121 is a continuous ring.

According to a variant that is not shown, the tip 1212 of each holding tool 12 may be discontinuous about the axis X of translation.

More specifically, where the bearing end 1211 is discontinuous, each bearing section, i.e. each portion of the tip 1212 in contact with the shoulder 24 of the container 2, is spaced apart regularly and circumferentially about the axis X of translation, so that the force created by a movement along the axis X only extends along this same axis.

If there is an odd number of contact portions, all of the contact portions are equidistant from each other.

If there is an even number of contact portions, the bearing end 1211 is then symmetrical about a plane of symmetry containing the axis X of translation.

The inversion device 1 also comprises a shaft 3 rigidly connected to drive means (not shown), the retaining member 121 being rigidly connected to the shaft 3 via damping means 4.

The damping means 4 are for example a compression spring.

Such damping means 4 enable the holding means 121 to be brought gently into contact with the container 2.

The holding force exerted on the container 2 along the axis X of translation is therefore gradual, which prevents the container 2 from being crushed and consequently deformed, or from being incorrectly positioned, which could prevent the base 21 from being inverted.

The inversion device 1 is built into a product packaging machine. For example, the inversion device 1 can be built into a system with container capping functions, in which case the inversion device 1 is positioned downstream of the capping function according to the direction of travel of the containers in the machine. The inversion device 1 can also be built into a system with container labeling functions, in which case said device is preferably positioned upstream of the means performing the labeling function.

The base 21 of a container 2 is inverted according to a method comprising the following steps:
holding said container 2 with a holding tool 121, and
inverting the base 21 of said container 2 by moving the inverting means 11 along the axis X of translation.

The step of holding the container 2 is described below with reference to FIGS. 3, 4 and 5.

The step of holding the container 2 comprises a first sub-step that involves moving the holding tool 12 towards the container 2 in a translational movement T, as shown in FIG. 3.

The holding tool 12 is moved along the axis X of translation until the centering member 122 comes into bearing contact with the cap 25 of the container 2, as shown in FIG. 4.

When the centering member 122 cooperates with the upper end of the container 2, in particular the cap 25 thereof, the frustoconical shape of the centering member 122 centers the container 2 by cooperating with the cap 25, so that the main axis A of the container 2 is coincident with, or at least parallel to, the axis X of translation.

The following sub-step involves holding the centering member 122 against the cap 25 of said container 2.

To do so, the return element 13 pushes the centering member 122 away from the base of the retaining member 121, i.e. against the cap 25.

The last sub-step involves continuing to move the retaining member 121 in the direction of movement T along the axis X of translation, until the bearing end 1211 of the retaining member 121 is bearing against the shoulder 24 of the container 2, as illustrated in FIG. 5, preferably at the shoulder 24 thereof.

Once the container 2 has been centered and is being held by the holding tool 12, the inverting means 11 can then be actuated to invert the base 21 of the container and switch the diaphragm 212 to the concave position, i.e. a rigid state, as illustrated by the dotted lines in FIG. 6.

Once the diaphragm 212 has been inverted, the holding tool 12 can be withdrawn from the container 2.

To do so, the holding tool 12 is moved along the axis X of translation in a direction opposite to the direction of movement T.

This firstly disengages the bearing end 1211 from the shoulder 24 of the container.

The holding tool 12 is then moved until the centering member 122 disengages from the cap 25, which completely releases the container 2.

Preferably, at least one of the following rules is applied to the method for inverting a base 21:
the inversion of the base 21 is initiated once the centering member 122 is bearing against the container 2 and before the retaining member 121 is bearing against a shoulder 24 of the container 2,
the retaining member 121 is released from the container 2 before the inverting means 11 have completed a return movement to a starting position,
the retaining member 121 is in contact with the container 2 before the inverting means 11 start to move,
the retaining member 121 is kept in contact with the container 2 until the inverting means 11 have stopped moving.

The inversion device 1 is mounted on a carousel rigidly connected to a frame of the packaging machine. Each holding tool 12 consequently follows the movement of the container with which the tool is cooperating along a curved path.

The inversion device 1 described above provides for the efficient inversion of the base 21 of a container 2 while limiting the risk of damage being caused to the container 2 during inversion of the base 21.

The movement of the centering member 122 inside the retaining member 121 breaks the holding step down into a first centering step (by cooperation between the centering member 122 and the cap 25) and a second compression step (by cooperation between the retaining member 121 and the container 2).

Indeed, the movement of the centering member 122 enables an incorrectly positioned container 2 to be centered before the holding force is applied.

Consequently, when the bearing end 1211 of the retaining member 121 exerts a force on the shoulder 24 of the container 2, the force is uniform on the container 2 and centered on the main axis A of the container 2, which obviates the risk of the container 2 being deformed by a localized force exerted by the retaining member 121 on the container 2. This prevents the container 2 from being damaged and optimizes inversion of the base 21.

The invention claimed is:
1. A device for inverting a base of a container, the inversion device comprising:
means for inverting the base along an axis of translation, and
at least one holding tool for holding the container,
the at least one holding tool comprising a retaining member having a central recess, the at least one holding tool being moveable in translation along the axis of translation between a position withdrawn from the container and a position cooperating with the container, wherein the retaining member has a bearing end and a base end, the bearing end configured for bearing against a shoulder of the container in the cooperating position,
and in that the at least one holding tool also comprises:

a centering member mounted in the central recess of the retaining member that is intended to cooperate with a cap rigidly connected to a neck of the container, the centering member being moveable inside the retaining member between:
  a first position, corresponding to the withdrawn position of the retaining member, in which the centering member is near to the bearing end of the retaining member, and
  a second position, corresponding to the cooperating position of the retaining member, in which the centering member is withdrawn from the bearing end of the retaining member, wherein the retaining member has a bell shape, and wherein the retaining member includes a tip carrying the bearing end, the tip being removably mounted on a free end of the bell opposite the base end.

2. The inversion device according to claim 1, wherein the centering member has an outward flared shape intended to cooperate with the cap of the container.

3. The inversion device according to claim 1, wherein the bearing end of the retaining member has an outward flared shape intended to bear against the shoulder of the container.

4. The inversion device according to claim 1, wherein the at least one holding tool comprises a return element interposed between the base end of the bell and the centering member, the return element tending to position the centering member in the first position.

5. The inversion device according to claim 1, further comprising a shaft rigidly connected to drive means, the retaining member being rigidly connected to the shaft via a damping means.

6. A holding tool for a device for inverting the base of a container, the holding tool comprising a retaining member having a central recess, the holding tool being moveable in translation along an axis of translation between a position withdrawn from a container and a position cooperating with a container, wherein the retaining member has a bearing end that bears against a shoulder of the container in the cooperating position, and wherein the at least one holding tool also comprises:
  a centering member mounted in the central recess of the retaining member that is intended to cooperate with a cap rigidly connected to a neck of the container,
  the centering member being moveable inside the retaining member between:
    a first position, corresponding to a withdrawn position of the retaining member, in which the centering member is near to the bearing end of the retaining member, and
    a second position, corresponding to the cooperating position of the retaining member, in which the centering member is withdrawn from the bearing end of the retaining member,
  wherein the retaining member includes a tip carrying the bearing end, the tip being removably mounted on a free end of the retaining member opposite a base portion thereof.

7. A method for inverting a base of a container using an inversion device according to claim 1, the method comprising the following steps:
  holding a container with a base to be inverted, and
  inverting the base of said container by moving an inverting means along an axis of translation,
wherein the holding step comprises the following sub-steps:
  moving a holding tool towards the container along the axis of translation until a centering member is bearing against the cap of said container,
  holding the centering member against a cap of said container, and
  moving the retaining member towards the container along the axis of translation.

8. The method for inverting a base of a container according to claim 7, wherein inversion of the base is initiated once the centering member is bearing against the container and before the retaining member is bearing against a shoulder of the container.

9. The method for inverting a base of a container as claimed in claim 7, wherein the retaining member is released from the container before the inverting means have completed a return movement to a starting position.

10. The method for inverting a base of a container as claimed in claim 7, wherein the retaining member is in contact with the container before the inverting means start to move.

11. The method for inverting a base of a container as claimed in claim 7, wherein the retaining member is kept in contact with the container until the inverting means have stopped moving.

12. A device for inverting a base of a container, the inversion device comprising:
  means for inverting the base along an axis of translation, and
  at least one holding tool for holding the container,
  the at least one holding tool comprising a retaining member, the at least one holding tool being moveable in translation along the axis of translation between a position withdrawn from the container and a position cooperating with the container, wherein the retaining member has a bearing end that bears against a shoulder of the container in the cooperating position,
  and in that the at least one holding tool also comprises:
    a centering member mounted to the retaining member that is intended to cooperate with a cap rigidly connected to a neck of the container,
    the centering member being moveable inside the retaining member between:
      a first position, corresponding to the withdrawn position of the retaining member, in which the centering member is near to the bearing end of the retaining member, and
      a second position, corresponding to the cooperating position of the retaining member, in which the centering member is withdrawn from the bearing end of the retaining member,
    wherein the retaining member includes a tip carrying the bearing end, the tip being removably mounted on a free end of the retaining member.

* * * * *